United States Patent
Nelson

[15] 3,696,878
[45] Oct. 10, 1972

[54] BELT TRACTION VEHICLE

[72] Inventor: Stanford C. Nelson, 8 South Merrill Avenue, Park Ridge, Ill. 60068

[22] Filed: April 5, 1971

[21] Appl. No.: 131,522

Related U.S. Application Data

[63] Continuation of Ser. No. 41,735, June 1, 1970, abandoned, which is a continuation of Ser. No. 740,328, June 26, 1968, abandoned.

[52] U.S. Cl. ............... 180/9.46, 180/14, 180/9.64, 305/34, 305/35 EB
[51] Int. Cl. ..................... B62d 55/30, B62d 53/00
[58] Field of Search............ 180/6.7, 9.44, 9.46, 9.62, 180/9.64, 9.2; 280/DIG. 7; 305/34, 35 EB; 115/1

[56] References Cited

UNITED STATES PATENTS

| | | |
|---|---|---|
| 999,971 | 8/1911 | Eckley................180/9.64 X |
| 2,220,418 | 11/1940 | McIntyre...................180/6.7 |
| 2,546,523 | 3/1951 | Reynolds.................180/6.64 |
| 2,698,667 | 1/1955 | Kropp....................180/6.7 X |
| 2,992,863 | 7/1961 | Fredricks.................305/34 X |
| 3,011,576 | 12/1961 | Howes...........................180/5 |
| 3,116,956 | 1/1964 | Maradyn..................305/31 X |
| 3,180,305 | 4/1965 | Rempel.........................115/1 |
| 3,435,907 | 4/1969 | Imhoff......................180/5 R |
| 3,473,619 | 10/1969 | Dion...........................180/14 |
| 3,504,753 | 4/1970 | Rutley........................180/14 |

*Primary Examiner*—Richard J. Johnson
*Attorney*—Hill, Sherman, Meroni, Gross and Simpson

[57] ABSTRACT

Traction vehicle in which a traction unit and a steering unit are connected together by a universal connection enabling the two units to pivot about longitudinal and transverse axes. Each unit is supported on endless flexible traction devices trained about low pressure rubber tires and maintained under tension by tension idlers forming guides for the flexible traction devices. The wheel base of the wheels of each unit is shorter than the distance between the transverse centers of the endless traction devices and the four wheels of the traction unit are power driven by a reversable drive connection. Steering and the controls for the traction unit are on a platform on the steering unit held in alignment with the traction unit by the universal connection. Steering is attained by turning the steering unit relative to the platform.

15 Claims, 10 Drawing Figures

PATENTED OCT 10 1972

INVENTOR.

Stanford C. Nelson

BY Hill, Sherman, Meroni, Gross & Simpson

ATTORNEYS

INVENTOR.
Stanford C. Nelson

INVENTOR.
Stanford C. Nelson

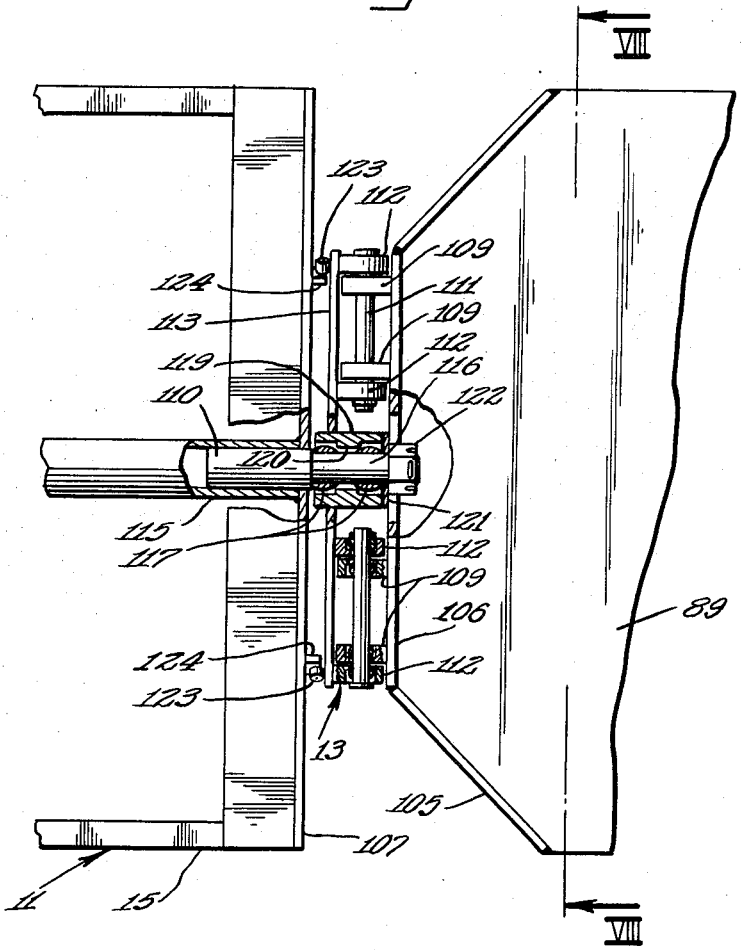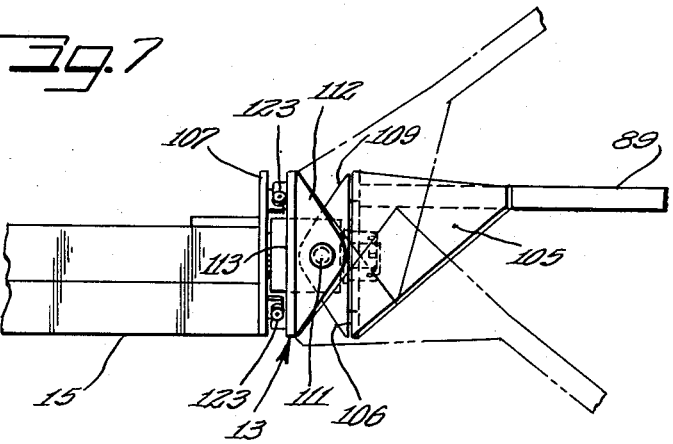

INVENTOR.
Stanford C. Nelson

BELT TRACTION VEHICLE

This is a continuation of Ser. No. 41,735, filed June 1, 1970, which was a continuation of Ser. No. 740,328 filed June 26, 1968, both now abandoned.

SUMMARY OF THE INVENTION AND OBJECTS

This invention relates to an improved vehicle for traveling over rough terrain having a steering unit and a traction unit connected together for relative movement about axes extending longitudinally and transversely of the units and between the units, in which the steering unit is pivoted about a vertical axis in advance of the traction unit and in which maneuverability of the vehicle over rough terrain is enhanced by the use of continuous flexible traction devices trained about and driven from low pressure rubber tires of the doughnut type, extending from relatively small diameter wheels.

A principal object of the invention is to provide an improved form of vehicle of the type described in which traction of the vehicle is attained by continuous flexible traction devices trained about low pressure rubber tires driven by power and maintained under tension by tension idlers forming guides for the traction devices about the tires.

Another important object of the invention is to provide an improved form of traction vehicle utilizing endless traction belts trained about low pressure rubber tires in which the belts are retained to the tires by tension idlers disposed in advance of one of the tires and by transversely spacing the centers of the tires distances greater than the wheel base of the wheels of each unit.

Still another object of the invention is to improve upon traction vehicles of the class described by providing a traction unit and a steering unit in advance of the traction unit and connecting these two units together by a universal connection accommodating movement of the units relative to each other about axes extending transversely and longitudinally of the units in which the steering unit includes a platform held from turning movement relative to the traction unit and steering is attained by pivoting the steering unit relative to the platform about a vertical axis disposed between the traction belts and axles of the unit.

A further object of the invention is to improve upon the traction vehicles heretofore in use in which the vehicles are propelled by laterally spaced endless traction tread devices by providing a rear traction unit and a front steering unit in which the two units are supported on wheels having low pressure tires thereon, and in which endless traction belts are trained about the wheels and have tractive and steering engagement with the ground, in which the traction unit is propelled in reverse directions through an engine and differential transmission device, while the steering unit is pushed or pulled by the traction unit in accordance with the direction of travel of the vehicle, and steering is attained by the reaction between a steering platform held from lateral movement relative to the traction unit and a steering wheel pivoting the steering unit and the associated continuous traction belts about a vertical axis disposed between the traction belts, and intermediate the wheel base for the wheels thereof.

These and other objects will appear from time to time as the following specification proceeds and with reference to the accompanying drawings.

DESCRIPTION OF THE DRAWINGS

FIG. 6 is a fragmentary plan view of the adjacent ends of the traction and steering units with certain parts broken away and certain other parts shown in section in order to illustrate the universal connection between the traction unit and the steering unit.

FIG. 7 is a fragmentary view in side elevation of the adjacent ends of the traction and steering units, showing the universal connection illustrated in FIG. 6.

DESCRIPTION OF PREFERRED EMBODIMENT OF INVENTION

Figure 1:
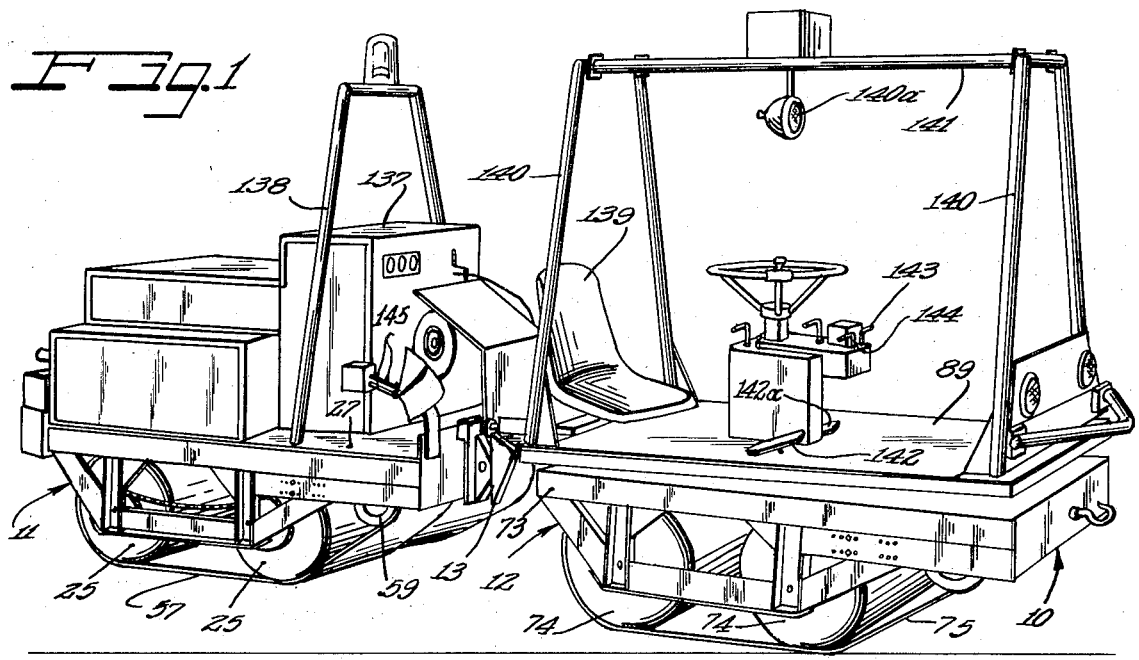
FIG. 1 is a perspective view of a traction vehicle constructed in accordance with the principles of the present invention.
Figure 2:
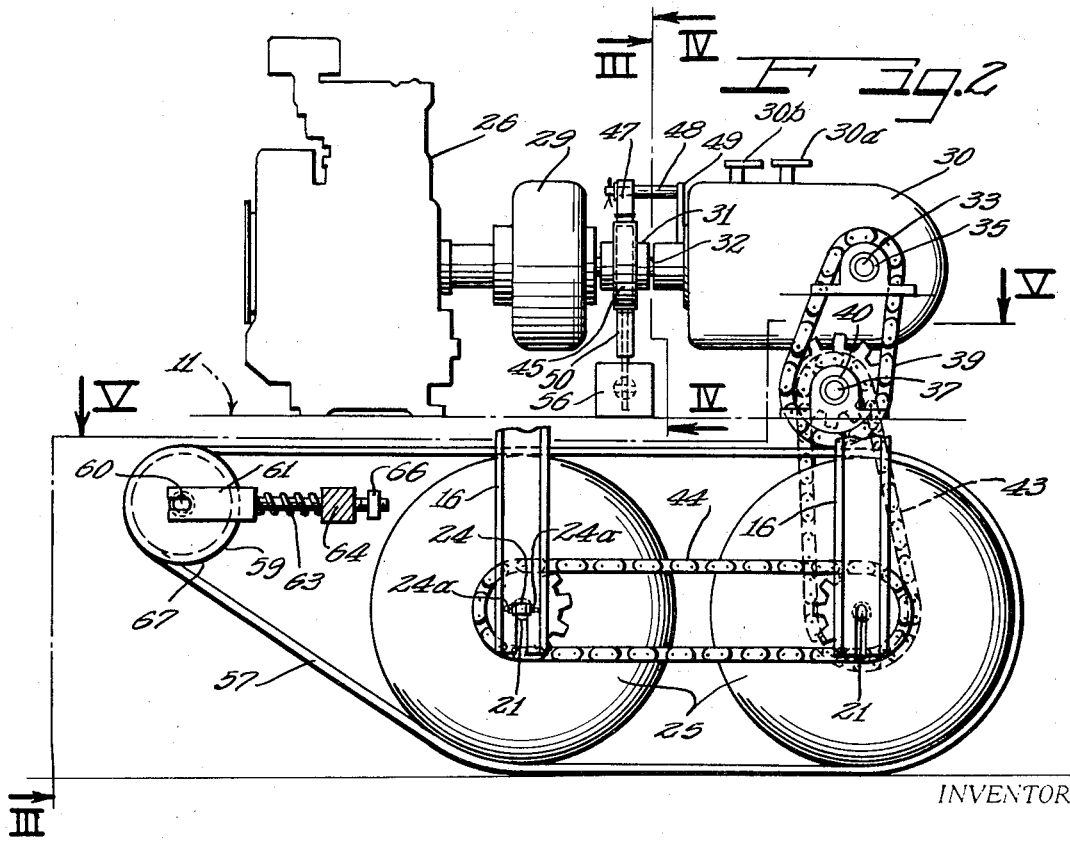
FIG. 2 is a fragmentary side view of the traction unit of the vehicle shown in FIG. 1, with certain parts removed.
Figure 3:
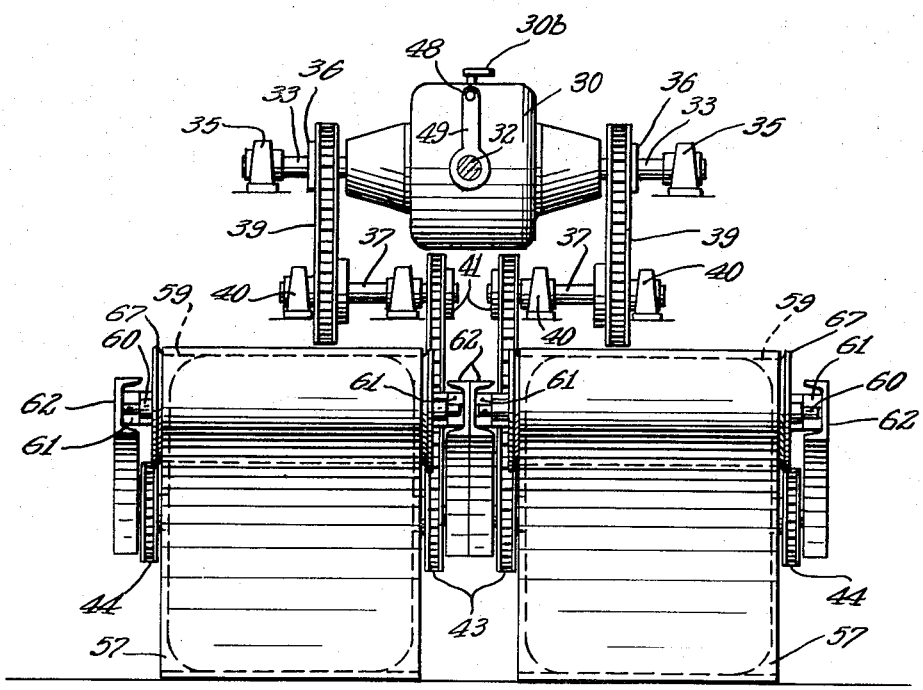
FIG. 3 is a fragmentary sectional view looking substantially along line III—III of FIG. 2.
Figure 4:
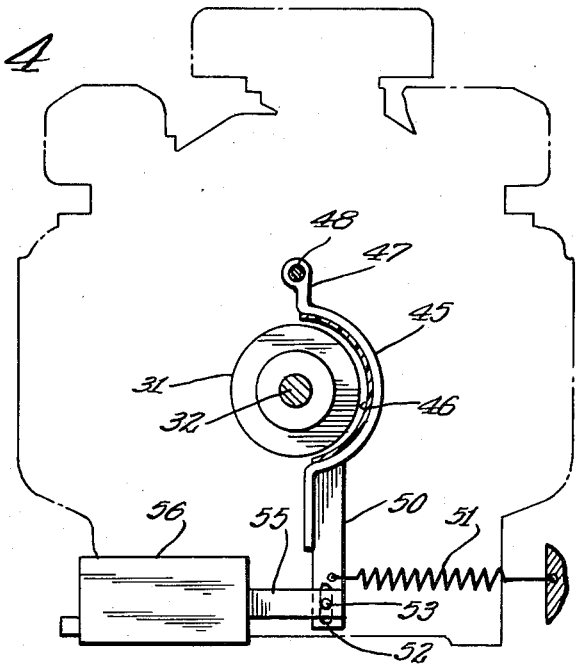
FIG. 4 is a fragmentary sectional sectional view taken substantially along the line IV—IV of FIG. 2 with the engine propelling the vehicle shown in phanthom.
Figure 8:
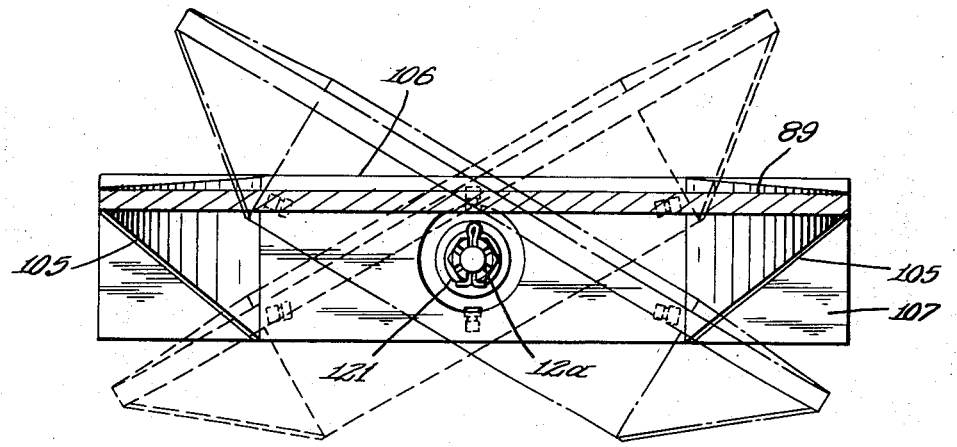
FIG. 8 is a fragmentary sectional view taken substantially along line VIII —VIII of FIG. 6 and showing certain other details of the universal connection between the traction unit and the steering unit not shown in FIGS. 6 and 7.

In the embodiment of the invention illustrated in the drawings, I have shown in FIG. 1 a traction vehicle 10 including a rear traction unit 11 and a front steering unit 12. The steering and traction units are connected together by a universal coupling 13 accommodating movement of said units relative to each other about axes extending longitudinally and transversely of the units and between the two units, as will hereinafter more clearly appear as this specification proceeds.

The rear traction unit 11 has outwardly facing channels 16,16 depending from the frame 15 and suitably connected together and braced and forming bolster members for transverse non-rotatable axle shafts 21. Facing channels 20,20 depending from the frame 15 along the center of the traction uniform bolsters for the inner ends the non-rotatable shafts 21. The non-rotatable axle shafts 21 have hollow shafts or tubes 22 journalled thereon and forming hubs for wheel disks 23 (FIG. 5) having low pressure rubber tires 25 mounted thereon. The low pressure rubber tires 25 are relatively wide and are of a large diameter with respect to wheels 23 and are of the doughnut type of tire known by the trade name of "TERRA TIRE." The rear axle shafts 21 have blocks 24 on the outer ends thereof having adjustment screws 24a threaded therein and engaging the flanges of the channels to align the rear axles with the front axles.

The wheel disks 23 and tires 25 are driven from an internal combustion engine 26 on a platform 27 for the frame 15 of the traction unit 11. The internal combustion engine 26 is shown as having driving connection with a fluid coupling 29 connected with suitable change speed and reverse gearing (not shown) enclosed in a casing 30, and driving differential gearing enclosed in said casing. The casing 30 including the change speed, reverse and differential gearing is a conventional unit, known to the trade as a "transaxle" so need not be shown or described in detail herein. Shifting levers 30a and 30b are provided on the top of said casing, suitably connected to shifting levers 145 on the steering unit 12. The connection from the fluid coupling to the change speed, reverse and differential gearing in the casing 30 is shown as being in the form of a flexible coupling 31 driving a shaft 32 journalled in the casing 30. The casing 30 has two axially aligned shafts 33 extending outwardly therefrom and driven from the differential gearing therein (not shown) in a conventional manner. The shafts 33 are journalled at their outer ends in pillow boxes 35 and have sprockets 36 keyed or other wise secured thereto driving countershafts 37,37 through chain and sprocket drives 39. The countershafts 37 are journalled in pillow boxes 40 and have sprockets 41 at their inner ends, spaced inwardly of the wheel disks 23, and having driving connection with the aligned hollow shafts or hubs 22 and wheel disks 23 through chain and sprocket drives 43.

The front and rear wheels are connected together by chain and sprocket drives 44 driven from the rear hollow shafts or hubs 22 and having driving connection with the forward hollow shafts or hubs 22 to effect a drive to all four wheels of the vehicle.

A braking means is provided to slow down the change speed gearing in the casing 30 and accommodate shifting of the gears therein. Said braking means is herein shown as being in the form of a brake shoe 45 generally conforming to the form of the periphery of the flexible coupling 31 and having a friction brake lining 46 on its inner side. The shoe 45 has an upright arm 47 transversely pivoted at its upper end on a pivot pin 48 extending parallel to the axis of the universal coupling 31 and secured to the casing 30 and spaced in advance of the front face of said casing.

The brake shoe 45 has a lever arm 50 depending therefrom, biased in position to disengage the shoe or lining 46 from the universal coupling 31 by a tension spring 51. A slot 52 in the lower end portion of the arm 50 is engaged by a pin 53 mounted at its ends in the bifurcated end portion of an armature 55 extending from a solenoid 56. The solenoid 56 is energized upon operation of a shifting lever 145, to slow down the change speed gearing within the casing 30 and accommodate smooth shifting of the gears.

The traction devices of the traction unit 11 comprise endless belts 57 trained about the tires 25 on each set of front and rear wheels. The belts 57 may be fabric and rubber belts or may be made from various other materials which have good tractive effort with the ground and give a long life and lay a track along the ground on which the rubber tires may ride. Each belt 57 is trained about a tension idler 59 at the front of the traction unit 11 and mounted for free rotation on a transverse non-rotatable shaft 60. The shaft 60 is mounted at its opposite ends in blocks 61 slidably guided for movement between the flanges of channels 62, forming a part of the frame 15 for the traction unit. The blocks 61 each have a rod 63 extending rearwardly therefrom guided in guide blocks 64 welded or otherwise secured to the webs of the channels 62. A compression spring 65 extends about the rod 63 and is interposed between the blocks 61 and 64. A nut 66 is threaded on the inner end of each rod to limit extensible movement of the rod by the spring 65. The compression springs 65 are of sufficient strength to bias the idler 59 to maintain the belt 57 to the required tension so the belt may lay a track along which the low pressure rubber tires 25,25 may move. The idler 59 is shown as having radial flanges 67 at its outer ends to maintain the belt to said idler and also to guide the belt about the low pressure tires 25,25.

Figure 5:
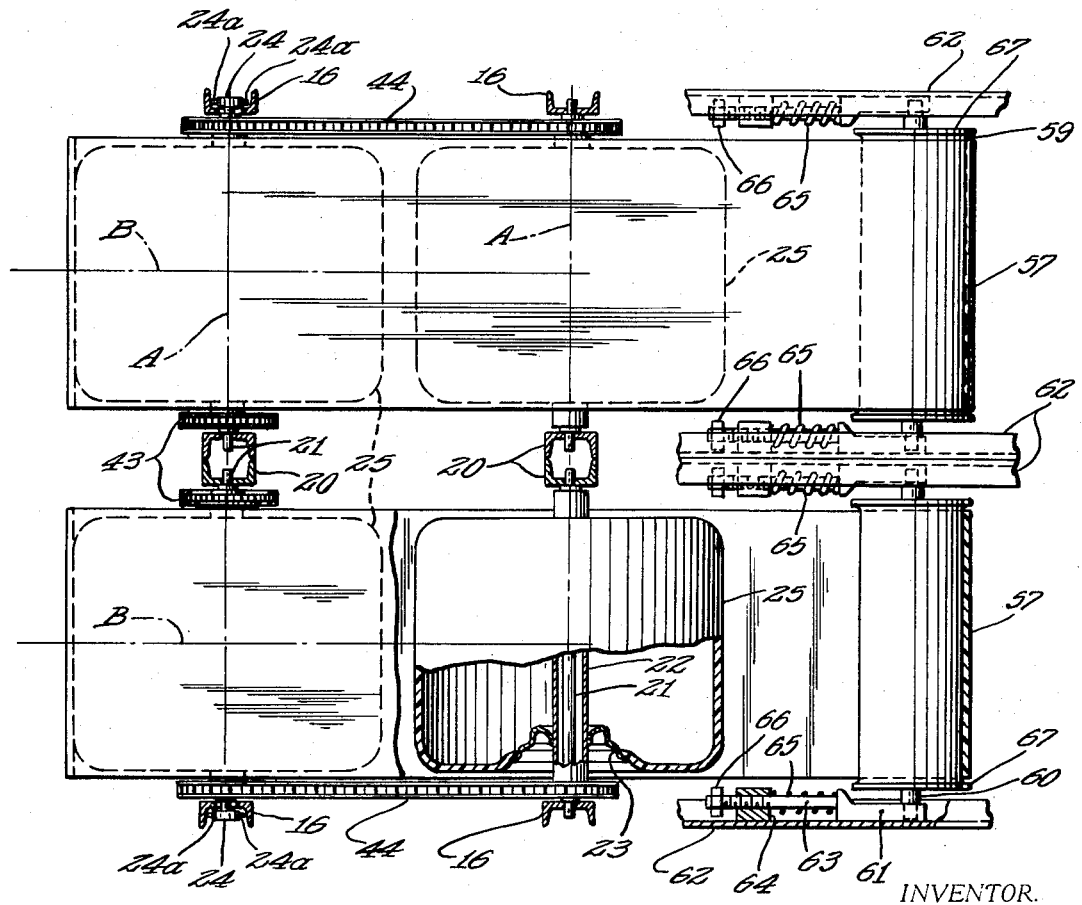
FIG. 5 is a fragmentary sectional view taken substantially along line V—V of FIG. 2 with certain parts removed.

In FIG. 5, the wheel base of the traction unit is between center lines A. The transverse centers of the tires 25 and belts 57 are designated by center lines B. FIG. 5 illustrates that the space between the center lines B is greater than the space between the center lines A, resulting in a rectangular arrangement of the wheels 25 and belts 57 with the long side of the rectangle facing in the direction of travel of the vehicle. This results in a stable supporting and drive arrangement for the vehicle and retains the belts 57 to the low pressure tires 25 by the tension of the belts applied thereto by the tension idlers 59. The traction unit, therefore, can travel over relatively rough terrain and make sharp turns and the belts 57 will be retained in centered relation with respect to the wheels 25.

The steering unit 12 comprises a steering frame 73 mounted on low pressure tires 74 having belts 75 trained thereabout and about tension idlers 76 mounted at the front of said frame for rotation about transverse shafts 77. The tension idlers 76 are biased to maintain tension on the belts by compression springs 79 interposed between blocks 80 extending inwardly of the webs of channels 81 and blocks 82 forming mountings for the shaft 77. The mountings for the wheels 74 and the training of the belts 75 about the aligned wheels is the same as in the traction unit 11, except the wheels 74 are not driven by power, although they may be driven by power if desired.

The frame 73 has a central boss 83 having a self-aligning bearing 84 carried thereby forming a mounting for a vertically extending steering column 85. The steering column 85 is mounted in a housing 86 for said steering column and on spaced self-aligning bearings 87 and 88. The housing 86 is carried on a platform 89 and extends upwardly therefrom. The platform 89 is held from turning movement by the universal draft connection 13. The steering column 85 thus reacts between the platform 89 and steering frame 12 to effect turning movement of said steering frame about the axis of the column 85, as will hereinafter more clearly appear as this specification proceeds.

A cover 90 is provided for the top of the housing 86 to enclose reduction gearing 91 journalled in said housing and provided to turn the steering column 85 at a reduced speed by operation of a steering wheel 93. The cover 90 is shown as having parallel hollow bosses 94 and 95 extending upwardly therefrom. These bosses form alternate sockets for a post 96 depending from the steering wheel 93 and having a splined lower end portion having driving engagement with a pinion 97 in axial alignment with the boss 94 to turn the steering column through the reduction gearing 91. A second pinion forms a drive member for the reduction gearing 91 and is coaxial with the hollow interior portion of the boss 95 and has a splined interior portion 99 engaged by the splined end of the post 96 for steering the vehicle when the steering post 96 is in engagement with the hollow boss or socket 95. As shown herein, the steering post is usually placed in the socket 94, for steering the vehicle, when traveling forwardly, while the steering post is usually placed in the socket 95 when the vehicle is traveling rearwardly. A seat 139 is removably mounted on the platform 89 and is positionable in accordance with the direction of travel of the vehicle, to enable the operator to sit down and steer and face in the direction of travel of the vehicle.

Referring now to the universal connection 13 between the units, holding the platform 89 in longitudinal alignment with the traction unit 11, the platform 89 has spaced brackets 100 depending therefrom and having rollers 101 mounted thereon and resting on the top surface of a top plate 103 of the frame 12.

The platform 89 also has a frame structure 105 extending about and downwardly of its rear end portion in rearwardly spaced relation with respect to the rear wheels 74 and belts 75, (FIGS. 6 and 7). The frame structure 105 includes a transverse vertically extending vertical plate 106 extending parallel to a transverse rear plate 107 of the traction unit frame 15. As shown in FIG. 6, the plate 106 has spaced bracket members 109 extending rearwardly therefrom on opposite sides of an axially extending pivot shaft 110. The bracket members 109 form bearing supports for transverse shafts 111, journalled at their opposite ends in bearing supports 112 extending rearwardly of a vertically extending plate 113 of the universal drive connection 13. The shaft 110 is shown in FIG. 6 as being mounted in a boss or tube 115 extending along the frame 15 rearwardly of the plate 107, and welded or otherwise secured thereto. The shaft 110 has a reduced diameter end portion 116 having spaced self-aligning bearing members 117 mounted thereon extending within a bearing collar 119. The bearing collar 119 extends through the plate 113 and is welded or otherwise secured thereto. The bearing collar 119 has an inwardly projecting reduced diameter central portion 120 extending between the self-aligning bearings 117 and rotatable thereabout. The collar 119 is abutted at its forward end by a washer 121, retained to said collar as by a nut 122 threaded on the end of the shaft 110 and held thereto as by a cotter key. The collar 119 thus serves to draw the steering unit with the traction unit through the washer 121 and nut 122 when the vehicle is traveling in a reverse direction. Rollers 123 are mounted on bracket members 124 extending forwardly of the plate 107 and have rolling engagement with the rear face of the plate 113, to reduce the frictional resistance between the plate 113 and the traction unit, as the units pivot with respect to each other about the axis of the shaft 110.

The universal draft connection thus accommodates movement of the traction frame and steering frame relative to each other about axes extending transversely and longitudinally of said frame as the traction and steering units tend to twist with respect to each other. The universal draft connection 13, however, holds the plate 89 from lateral movement with respect to the traction frame 11, and thus enables said plate to form a reaction member for steering the vehicle through the steering column 85.

Figure 9:
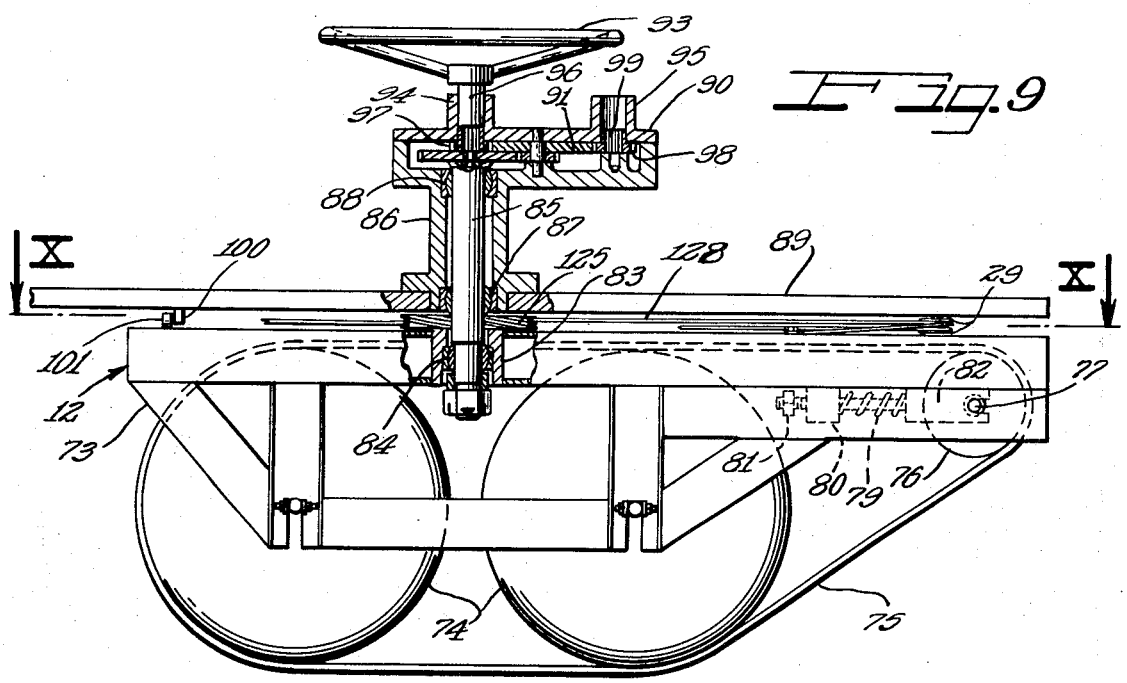
FIG. 9 is a fragmentary view in side elevation of the steering unit with certain parts broken away and certain other parts shown in vertical section in order to show the drive from the steering wheel to the steering column.
Figure 10:
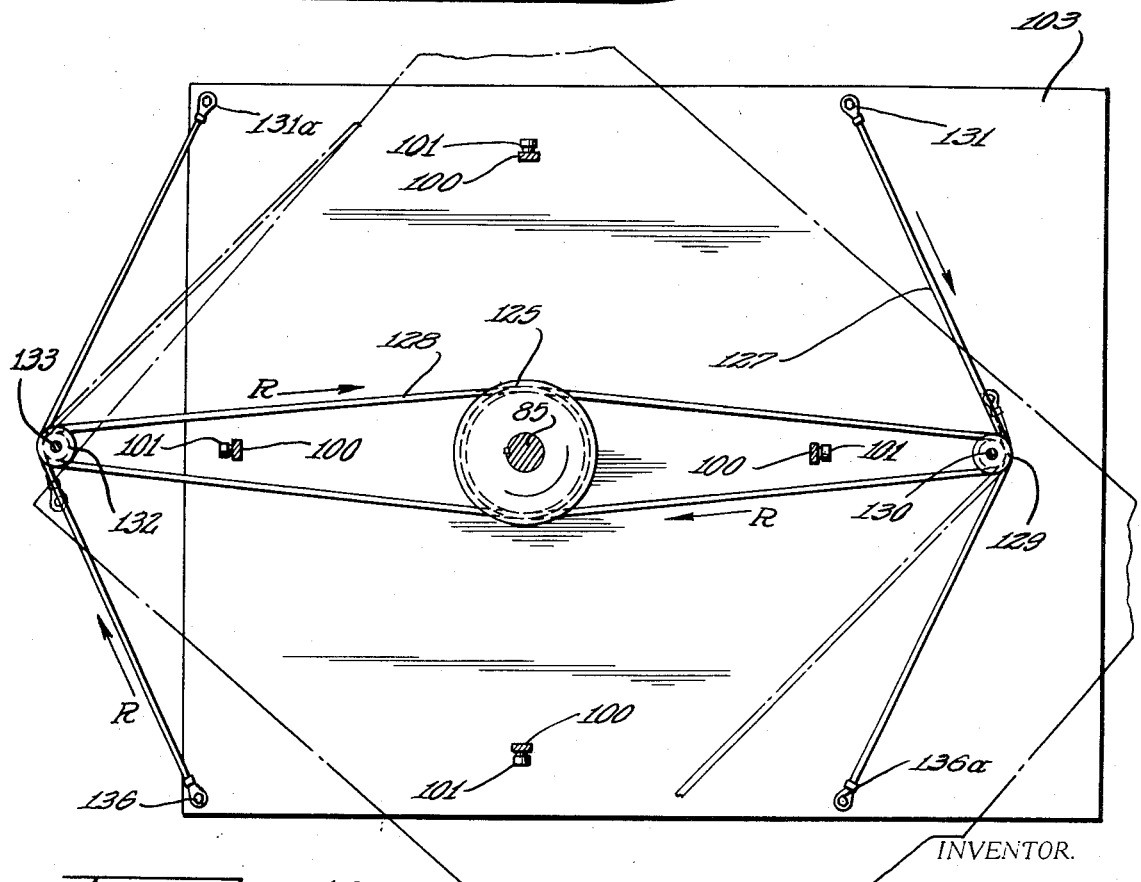
FIG. 10 is a fragmentary sectional view taken substantially along line X—X of FIG. 9.

The steering connection between the steering column 85 and the steering frame 12 is shown in FIGS. 9 and 10 as comprising a sheave 125 keyed or otherwise secured to the steering column 85 between the top of the steering frame 12 and the bottom of the platform 89. The sheave 125 has a groove therein of sufficient width to receive two steering cables 127 and 128, one disposed above the other and wrapped about said sheave. As shown in FIG. 10, a cable 127 is wrapped about the sheave 125 and suitably clamped thereto. One run of the cable 127 extends forwardly of the sheave 125 about a direction changing idler 129 mounted on a shaft 130 depending from the bottom of the platform 89. Two idlers 129 are mounted on the shaft 130, one above the other. The run of the cable 127 turned about an idler 129 extends laterally of the idler 129 in one direction and angularly rearwardly therefrom and is secured to the top plate 103 of the steering frame 12 on a pin or bolt 131. The opposite run of the cable 127 extends rearwardly of the sheave 125 about a direction changing idler 132 on a shaft 133 depending from the platform 89 secured to the plate 103 by a bolt 131a in a similar manner. Individual idlers 132 for the cables 127 and 128 are mounted on the shaft 133 one above the other. The end of the cable 127 extending about the idler 132, extends laterally angularly forwardly therefrom and is secured to the plate 103 on a pin or bolt 131a in the same manner as the cable 127 and is suitably clamped thereto.

The other cable 128 extends about the sheave 125 in opposite direction from the sheave 125. The opposite runs of the cable 128 then extend about the direction changing idlers 129 and 132 mounted on the underside of the platform 89. The runs of the cable extend laterally and angularly inwardly from the respective idlers 129 and 132 and are secured to opposite ends of the plate 103 by pins or bolts 136 and 136a in the same manner the ends of the cable 127 are secured to said plate. The direction changing idlers 129 and 132 are spaced equal distances from the axis of the steering column 85 and as the steering column 85 is turned in one direction or another the sheave 125 will draw in on one run of one cable and pay out of the other run of the same cable, to turn the steering frame 12 about the axis of the steering column 85 in an obvious manner.

The traction unit 11 is shown in FIG. 1 as having covering boxes 137, closing the engine 26 and transmission 30 and as having a roll bar 138 extending upwardly of a top platform of the frame 11 to protect the mechanism in case the vehicle should roll over. The steering unit 12 is shown as having a seat 139 for the operator, at the rear end thereof and having roll bars 140 extending upwardly from opposite ends thereof. The roll bars 140 are connected together by parallel bars 141 which are shown as forming a support for a depending headlight 140a. An accelerator pedal 142 is pivoted to one side of the housing 86 to be engaged by the foot of the operator from the seat 139. The accelerator pedal has connection with the carborator of the engine through suitable linkages in a conventional manner and is no part of the present invention so need not herein be shown or described. A brake pedal 142a may be provided on the opposite side of the steering housing 86 from the accelerator pedal 142.

As previously mentioned the seat is interchangeable from the position shown in FIG. 1 at the back of the steering housing 86 to a position at the front of the steering housing 86 with the operator facing the traction unit 11, when the vehicle is traveling in a reverse direction, with the traction unit leading the steering unit. In this position of the operator's seat, the post 96 is removed from the socket 94 and placed in the socket 95. A hand accelerator 143 is provided at the front of the housing 86, adjacent the socket 95, while a second hand lever 144 for operating the brake is provided at the opposite side of the housing.

It may be seen from the foregoing that a simple and improved form of vehicle, adapted for traveling over rough terrain has been provided and that the efficiency in travel of the vehicle is attained by the use of low pressure tires and by training endless belts about the tires, laying a track for the tires, having centers spaced farther apart than the wheelbase of the wheels of each unit and maintained to the tires by this spacing and by tension devices maintaining tension on the belts. It may further be seen that the vehicle is in the form of two units for ready maneuverability and that the front unit is normally the steering unit and includes a platform and operator's seat, held from lateral movement with respect to the traction section and mounted on a steering frame, turned relative to the platform by the operation of a steering wheel, and that the two units are of a simple and efficient construction with the controls and operative parts all in readily accessible positions.

While I have herein shown and described one form in which the invention may be embodied, it may readily be understood that various variations and modifications in the invention may be attained without departing from the spirit and scope of the novel concepts thereof.

I claim as my invention:

1. In a traction vehicle,
a traction frame,
front and rear laterally spaced sets of wheels journalled on said frame,
low pressure doughnut-type tires on said wheels having generally flat peripheral surfaces,
power means on said frame for driving at least two of said wheels,
endless flexible traction belts trained about said tires of said front and rear wheels and having relatively flat tire engaging surfaces,
means taking up tension on said belts comprising a tension idler for each belt, means biasing said tension idlers to maintain said belts under tension, said tension idlers being spaced longitudinally from an associated set of wheels,
said tires driving said belts solely by the frictional resistance between said tires and belts, and said belts laying a track for said tires to effect propulsion of the vehicle along the ground,
the distance between the axes of rotation of the front and rear wheels of each set approximating the distance between the transverse centers of said laterally spaced sets of wheels.

2. A traction vehicle in accordance with claim 1,
wherein the means biasing said tension idlers to maintain said belts under tension comprise spring means, and
wherein said tension idlers have radial flanges at their opposite ends maintaining the belts in alignment with said wheels.

3. A traction vehicle in accordance with claim 1,
wherein the power means for driving said wheels comprise:
an engine mounted on said frame,
a differential driven thereby,
shafts extending from opposite ends of said differential,
drive connections from said shafts to two laterally spaced wheels, and
drive connections from said two wheels to the longitudinally spaced wheels of each traction device.

4. A traction vehicle in accordance with claim 3,
wherein the differential includes a casing containing change speed gearing,
wherein the drive from said engine to said differential comprises:
a fluid coupling drive by said engine,
an input shaft driven by said fluid coupling and having driving connection with said differential, and
brake means having braking connection with said input shaft and selectively operable to retard rotation of said input shaft and the change speed gearing in said casing to accommodate shifting thereof.

5. In an articulated traction vehicle,
a power drive unit including a traction frame,
front and rear laterally spaced sets of wheels journalled on said frame,
tires on said wheels,
power means on said frame,
driving connections from said power means to at least two of said wheels and tires,
a steering unit spaced in advance of said drive unit and including a steering frame having spaced axles,
wheels on said axles,
tires on said wheels,
a platform mounted on said steering frame,
means connecting said platform to said steering frame to accommodate movement of said steering frame relative to said platform about a vertical axis,
and a draft connection between said traction unit and said platform, holding said platform longitudinally aligned relative to said traction frame but accommodating movement of said platform relative to said traction unit about an axis extending longitudinally of said traction unit and platform and a horizontal axis perpendicular to said longitudinal axis,
and means for selectively turning said steering frame relative to said platform about said vertical axis to steer the vehicle.

6. A traction vehicle in accordance with claim 5, wherein a steering column pivotally connects said platform to said steering frame, and wherein operative connections are provided between said steering column and said steering frame for turning said steering frame relative to said platform upon turning movement of said steering column.

7. A traction vehicle in accordance with claim 6, wherein the steering column extends vertically and is spaced between said wheels, wherein a steering wheel has operative connection with said steering column, and wherein an operator's seat is mounted on said platform in close proximity to said steering wheel.

8. A traction vehicle in accordance with claim 7, wherein the steering column is journalled on said steering frame for movement about a vertical axis disposed between said steering wheels, wherein a housing for said steering column extends upwardly of said platform, wherein bearing means are provided for journalling said steering column in said housing, wherein said housing has a pair of longitudinally spaced upwardly opening sockets therein, wherein gears are journalled coaxially of said sockets, wherein reduction gears mesh with said gears and have driving connection with said steering column, wherein the vehicle is reversable, and wherein the steering wheel is a removable steering wheel and has a shaft depending therefrom adapted to be removably mounted in either of said sockets into driving engagement with a selected of said gears coaxial with said sockets, in accordance with the direction of travel of the vehicle.

9. A traction vehicle in accordance with claim 6, wherein said steering column is journalled in said steering frame and said platform for turning movement about a vertical axis disposed between said wheels, wherein a steering wheel is provided for turning said steering column, wherein the steering connection from said steering column to said steering frame includes a drive sheave on said steering column between said steering frame and said platform, a cable clamped to said sheave and extending about said sheave, direction changing sheaves in axial alignment with the center of said drive sheave and spaced therefrom towards opposite ends of the vehicle, said cable being trained from said drive sheave with the runs thereof extending about said direction changing sheaves to the sides of said steering frame adjacent opposite ends thereof, and means securing the ends of said cable to said steering frame whereby turning of said steering wheel will turn said steering frame relative to said platform.

10. A traction vehicle in accordance with claim 9, wherein two cables are wrapped about and clamped to said drive sheave and extend therefrom in opposite directions toward the front and rear of said platform, and wherein the second cable is trained about said direction changing sheaves to opposite sides of the steering unit from the first cable and is secured to said steering frame adjacent opposite ends thereof.

11. A traction vehicle in accordance with claim 5, wherein the draft connection between said traction frame and said platform comprises a connection accommodating movement of said frames relative to each other about axes extending longitudinally and transversely of said frames and holding said platform from lateral movement relative to said steering frame.

12. A traction vehicle in accordance with claim 11, wherein the connection between said traction frame and platform comprises a longitudinally extending shaft extending along the center of the vehicle between said traction frame and said platform, a pivot bracket mounted for movement about the axis of said shaft and for movement about an axis extending transversely of said shaft, and a draft connection between said shaft and pivot bracket.

13. A traction vehicle in accordance with claim 11, wherein the connection between said traction frame and platform comprises:

a longitudinally extending shaft extending along the center of the vehicle between said traction frame and said platform, spaced transverse shafts mounted on said platform rearwardly thereof and on opposite sides of said longitudinally extending shaft, a pivot bracket mounted on said longitudinally extending shaft and on said transverse shafts for pivotal movement about the axes thereof and movably engaging said traction unit to thereby hold said platform from lateral movement relative to said traction unit.

14. A traction vehicle in accordance with claim 13, wherein a relatively high plate extends across the front of said traction unit, and wherein antifriction means extending from said plate have engagement with said pivot bracket to accommodate movement of said pivot bracket about said longitudinal shaft and to hold said pivot bracket from lateral movement with respect to said steering frame.

15. A traction vehicle in accordance with claim 5, wherein the draft connection between said traction frame and said platform comprises:

a longitudinal shaft extending forwardly from said traction frame along the axial center thereof, spaced transverse shafts disposed rearwardly of said platform and connected thereto on opposite sides of said longitudinal shaft, a pivot bracket mounted on said longitudinal shaft and on said transverse shafts for pivotal movement about the axes thereof, and a bearing engaging connection between said traction frame and said bracket and retaining said bracket from lateral movement with respect to said steering frame and thereby holding said platform from lateral movement with respect to said traction frame.

* * * * *